United States Patent
Ciet et al.

(10) Patent No.: US 8,094,813 B2
(45) Date of Patent: Jan. 10, 2012

(54) SYSTEM AND METHOD FOR MODULUS OBFUSCATION

(75) Inventors: Mathieu Ciet, Paris (FR); Augustin J. Farrugia, Cupertino, CA (US); Nicholas T. Sullivan, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 699 days.

(21) Appl. No.: 12/203,101

(22) Filed: Sep. 2, 2008

(65) Prior Publication Data

US 2010/0054459 A1   Mar. 4, 2010

(51) Int. Cl.
*H04L 9/00* (2006.01)
(52) U.S. Cl. .......................... 380/28; 713/168
(58) Field of Classification Search ........... 380/28–30; 713/168, 174, 189–190, 192–194; 726/26–27
See application file for complete search history.

(56) References Cited

U.S. PATENT DOCUMENTS

| | | | |
|---|---|---|---|
| 6,570,988 B1 * | 5/2003 | Venkatesan et al. | 380/28 |
| 2006/0291650 A1 * | 12/2006 | Ananth | 380/46 |

* cited by examiner

Primary Examiner — Hosuk Song
(74) Attorney, Agent, or Firm — Novak Druce + Quigg LLP

(57) ABSTRACT

Disclosed herein are methods for obfuscating data on a client, on a server, and on a client and a server. The method on a client device includes receiving input data, storing an operation value in a secure location, performing a modulus obfuscation on the operation value, performing a modulus operation on the operation value and the input data, performing a modulus transformation on the operation value and the input data to obtain client output data, and checking if the client output data matches corresponding server output data. The method on a server device includes receiving input data, performing a modulus transformation on the input data to obtain a result, performing a plain operation on the result and an operation value to obtain server output data, and checking if the server output data matches corresponding client output data from a client device that (1) receives input data, (2) stores an operation value in a secure location, (3) performs a modulus obfuscation on the operation value, (4) performs a modulus operation on the operation value and the input data, and (5) performs a modulus transformation on the operation value and the input data to obtain client output data. In an optional step applicable to both clients and servers, the method further includes authenticating the client input data and the server input data if the server output data matches the client output data. In one aspect, server input data and client input data pertain to a cryptographic key.

23 Claims, 7 Drawing Sheets

SYSTEM AND METHOD FOR MODULUS OBFUSCATION

CROSS-REFERENCE TO RELATED APPLICATIONS

This application relates to Application 8802.024.NPUS00 P6914, titled "System and Method for Conditional Expansion Obfuscation", Application 8802.017.NPUS00 P6835, titled "System and Method for Branch Extraction Obfuscation", and Application 8802.011.NPUS00 P6792, titled "System and Method for Array Obfuscation". The contents of each of these applications are herein incorporated by reference.

BACKGROUND OF THE INVENTION

1. Field of the Invention

The present invention relates to data obfuscation and more specifically to obfuscation by means of a modulus operation.

2. Introduction

Computer software is first written as source code which is readable by a person trained to understand programming languages. Generally that source code is then compiled to object code that contains a list of instructions controlling what a computer does. Unfortunately for commercial software vendors who wish to enforce licensing or Digital Rights Management (DRM) provisions, malicious or mischievous individuals with enough time and resources can reverse engineer critical portions of the object code. One technique to reverse engineer object code is to load the executable into memory and examine the memory contents with a piece of software called a debugger to locate the critical portions of software enforcing the restrictions. Once the proper portions of object code are located and reverse engineered, the software may be modified to perform in a manner not anticipated by the software vendor, potentially bypassing DRM or licensing restrictions, but also potentially causing great harm or injury.

In addition to protecting executable instructions compiled from source code, a content provider or software publisher may want to protect data from being copied or played without authorization, but still want the content to be accessible where there is authorization. DRM and software protection schemes in general work by means of code protection, security by design, code obfuscation, code hardening, and other methods. Even a blend of these approaches is often insufficient to keep out a determined "hacker" or "cracker". Such problems are exacerbated when attempting to secure code on a client device which a user has complete physical control over and which must interact securely with a server. In many situations, both the client and the server must perform the same operation with different levels of security such as a dedicated secure server and a portable media player. A designer may want to protect the processes performed by the portable media player from observation by a malicious user while still allowing the same operation to occur on a server without obfuscation and/or without a performance penalty. Accordingly, what is needed in the art is an improved way to store data and/or code on a client device and on a server while making the data and/or code difficult to access without proper authorization.

SUMMARY

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Disclosed are methods for obfuscating data on a client, on a server, and on a client and a server. The method on a client device includes receiving input data, storing an operation value in a secure location, performing a modulus obfuscation on the operation value, performing a modulus operation on the operation value and the input data, performing a modulus transformation on the operation value and the input data to obtain client output data, and checking if the client output data matches corresponding server output data. The method on a server device includes receiving input data, performing a modulus transformation on the input data to obtain a result, performing a plain operation on the result and an operation value to obtain server output data, and checking if the server output data matches corresponding client output data from a client device that (1) receives input data, (2) stores an operation value in a secure location, (3) performs a modulus obfuscation on the operation value, (4) performs a modulus operation on the operation value and the input data, and (5) performs a modulus transformation on the operation value and the input data to obtain client output data. In an optional step applicable to both clients and servers, the method further includes authenticating the client input data and the server input data if the server output data matches the client output data. In one aspect, server input data and client input data pertain to a cryptographic key.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only exemplary embodiments of the invention and are not therefore to be considered to be limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
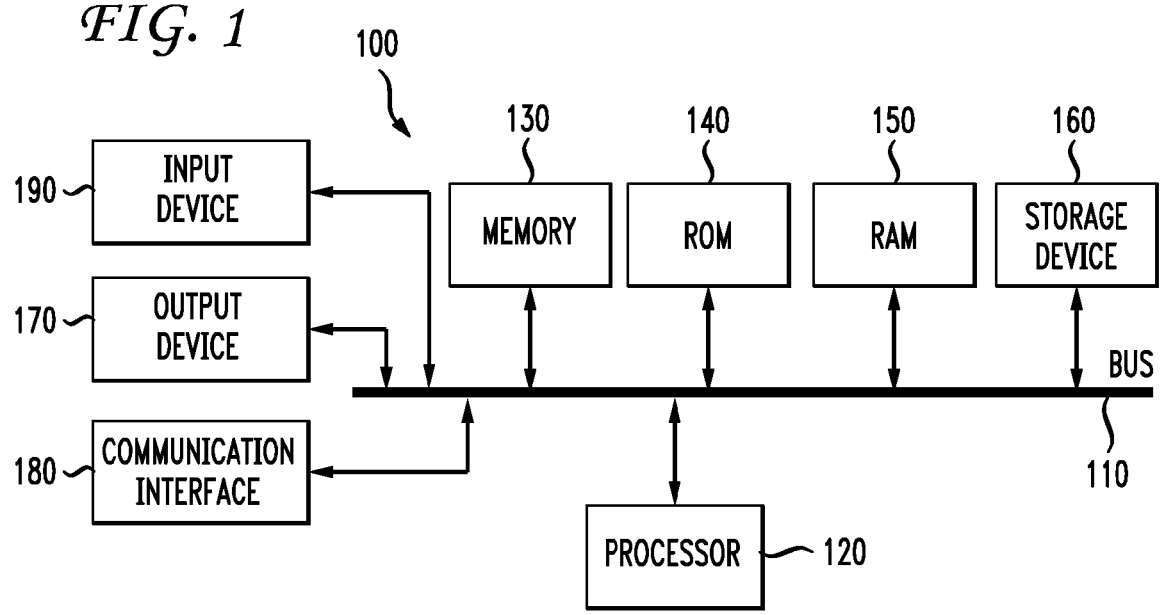
FIG. 1 illustrates an example system embodiment.

With reference to FIG. 1, an exemplary system includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together to provide greater processing capability. A processing unit 120 can include a general purpose CPU controlled by software as well as a special-purpose processor. Of course, a processing unit includes any general purpose CPU and a module configured to control the CPU as well as a special-purpose processor where software is effectively incorporated into the actual processor design. A processing unit may essentially be a completely self-contained computing system, containing multiple cores or CPUs, a bus, memory controller, cache, etc. A multi-core processing unit may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. In one aspect, a hardware module that performs a particular function includes the software component stored in a tangible computer-readable medium in connection with the necessary hardware components, such as the CPU, bus, display, and so forth, to carry out the function. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The input may be used by the presenter to indicate the beginning of a speech search query. The device output 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed.

For clarity of explanation, the illustrative system embodiment is presented as comprising individual functional blocks (including functional blocks labeled as a "processor"). The functions these blocks represent may be provided through the use of either shared or dedicated hardware, including, but not limited to, hardware capable of executing software and hardware, such as a processor, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits.

Having discussed the fundamental components of an example system which can implement the method, and keeping in mind that the method can also be embodied in a computer-readable medium which stores instructions to perform the method, the disclosure turns to the various method embodiments individually. Each method is discussed in terms of a system configured to practice the method. The overall high-level view of modulus obfuscation is that a server performs a simple type of operation and clients perform a different, more complex set of operations to arrive at the same result. One of the goals of the modulus obfuscation is that a user observing the client device may not easily see the plain operation or the input value.

The multiplicative group $(Z/(n^2.Z))^*$ has the property that is isomorphic to the direct product of two subgroups, one of size n and one of size phi(n), phi being the Euler phi function otherwise known as the Euler totient function. Z is the group of signed integers. The Euler function phi(n) is defined as the number of positive integers less than or equal to n that are also coprime to n, meaning that they share no common factor other than 1. For example, phi(14) =6, because six numbers, 1, 3, 5, 9, 11, and 13, are coprime to 14. Elements of the subgroup of size n are isomorphic to a*n+1. Multiplication in this subgroup has the following property: (a *n+1)*(b*n+1)=((a+b mod $n^2$)+1).

Moreover, for any element in the group, $m^{(phi(n))}$ is part of the subgroup of size n. Therefore, arithmetic over $(Z/(n^2.Z))^*$ corresponds to arithmetic over a group of size n by only looking at the coset of a value with respect to the group of size n. A coset is a subset of a mathematical group that consists of all the products obtained by multiplying either on the right or the left a fixed element of the group by each of the elements of a given subgroup. In this correspondence, computing $m^{(phi(n))}$ for any m in the group results in a value that corresponds to the elements 0*n+1. This is a key property that allows the method to function properly.

Figure 2:
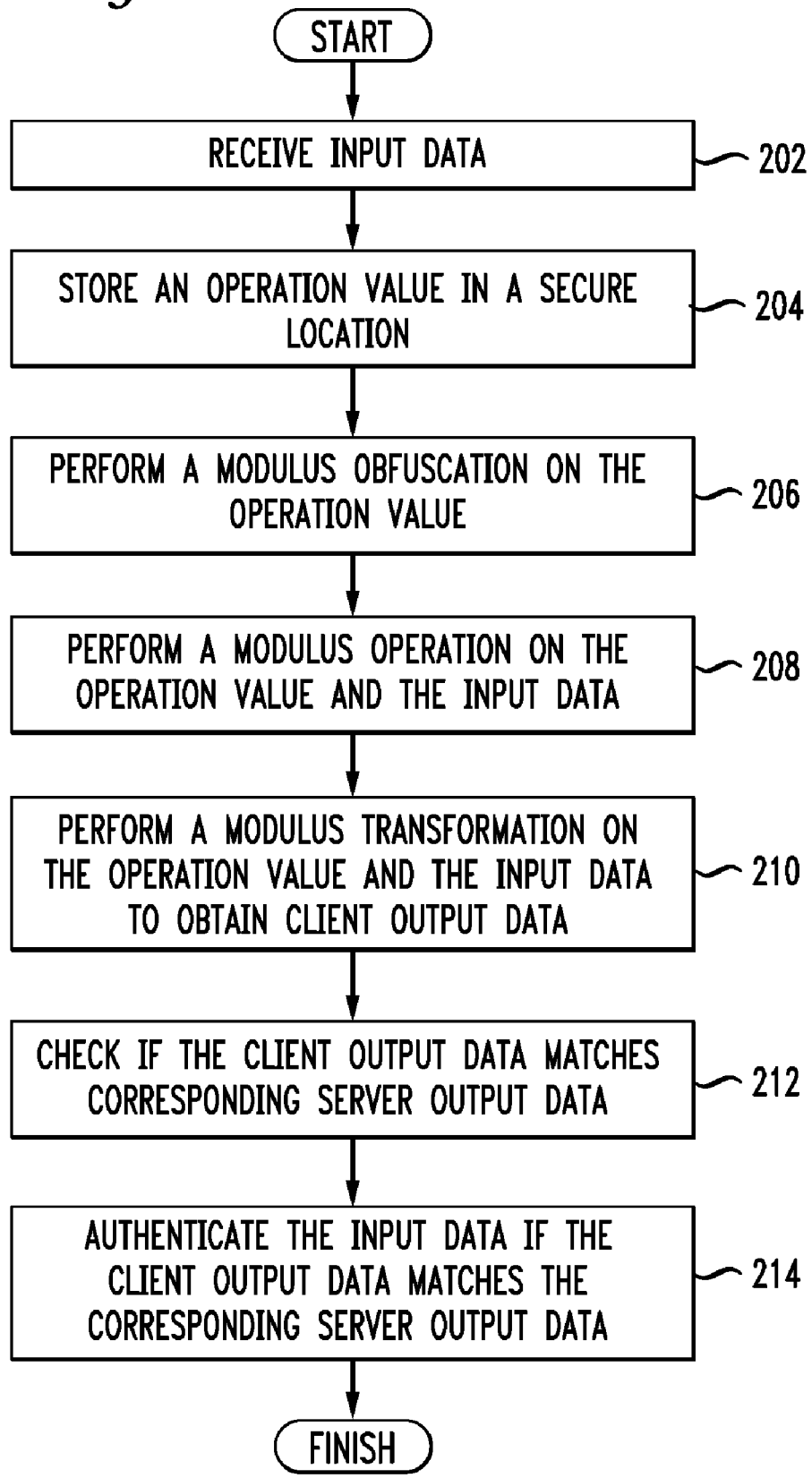
FIG. 2 illustrates an example client method embodiment.

FIG. 2 illustrates an example client method embodiment. The method embodiment is discussed in terms of a system configured to practice the method, such as a personal computer, a server, a portable device, etc. The system receives input data 202. Input data can relate to a cryptographic key or other piece of information that determines the output of the modulus obfuscation. The system stores an operation value in a secure location 204. The operation value can be a combination of two values, a and b. The operation value can be a constant or an equation, for example, so long as it is shared on both the client and the server. The system can further split values a and b into sets of values or components of equations that respectively sum to a and b. If the system splits values a and b, then the system can modify the modulus operation to compute M1 through successive exponentiation and repeated multiplication. Some examples of secure locations to store the operation value include computer memory protected by IBM SecureBlue technology, a tamper-resistant encrypted hard disk, ROM, etc.

The system then performs modulus obfuscation on the operation value 206. The system can perform the modulus obfuscation by computing $X=((a*phi(n))*(n+1)^{r1}+(n*r2))$ and computing $Y=((b*n+1)*(r3^n))$, where r1 is an integer coprime with n*phi(n), where r2 and r3 are non-zero, where n is a positive integer, and where phi is the Euler phi function. Numbers are coprime if they have no common factor other than 1. Euler's phi function of a positive integer n is the number of integers between 1 and n which are coprime to n. Those of skill in the art will understand what the Euler phi function is and how to calculate it. The values r1 and r2 are stirring values that do not affect the output as long as they are selected from the group of non-zero integers coprime with n*phi(n). The purpose of r1 and r2 is to obfuscate or confuse any would-be reverse engineers or other attackers. Other variations exist, but this form of modulus obfuscation is perhaps the simplest form.

The system performs a modulus operation on the operation value and the input data 208. The system can perform the modulus operation by computing $M1=((\text{input data})^X)*Y$. The input data is a variable representing a message, such as a cryptographic key. The system can use the value M1 to perform a modulus transformation on the operation value and the input data to obtain client output data. In one aspect, the system performs the modulus transformation is to compute client output data=$(-(M1^{phi(n)} \mod n^2) \mod n)$. Once the system has calculated the client output data, the system can check if the client output data matches corresponding server output data 212. If the client and server output data match, the system can optionally authenticate the client input data 214. One example result of authentication is a server permitting a portable device to access a restricted file or network resource, such as an online digital music store allowing a digital audio player (DAP) to play a DRM'd file stored locally on the DAP.

Figure 3:
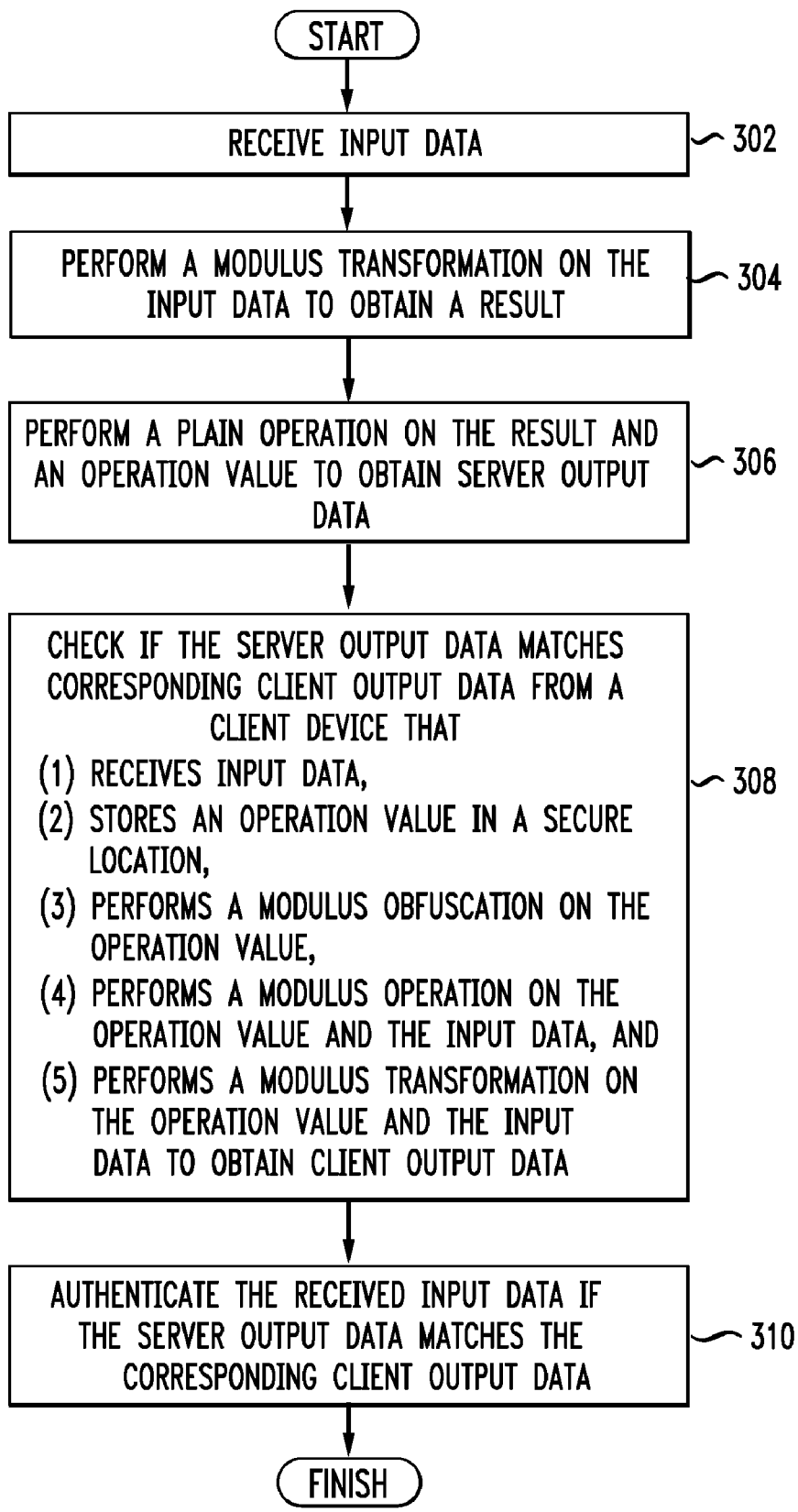
FIG. 3 illustrates an example server method embodiment.

FIG. 3 illustrates an example server method embodiment. The server receives input data 302. As discussed above, input data can relate to a cryptographic key or other information that determines the output of the modulus obfuscation. The server performs a modulus transformation on the input data to obtain a result 304. The server can perform the modulus transformation by computing $M=((\text{input data})^{phi(n)} \mod n^2)$, where n is a positive integer and where phi is the Euler phi function. Then the server can perform a plain operation on the result and an operation value to obtain server output data 306. The plain operation can include computing server output data=$(((M-1)/(-n)*a)+b) \mod n$, where a and b are parts of an operation value. Having calculated the server output data, the server can then check if the server output data matches corresponding client output data from a client device that (1) receives input data, (2) stores an operation value in a secure location, (3) performs a modulus obfuscation on the operation value, (4) performs a modulus operation on the operation value and the input data, and (5) performs a modulus transformation on the operation value and the input data to obtain client output data 308. The server can authenticate the received input data if the server output data matches the corresponding client output data 310.

Figure 4:
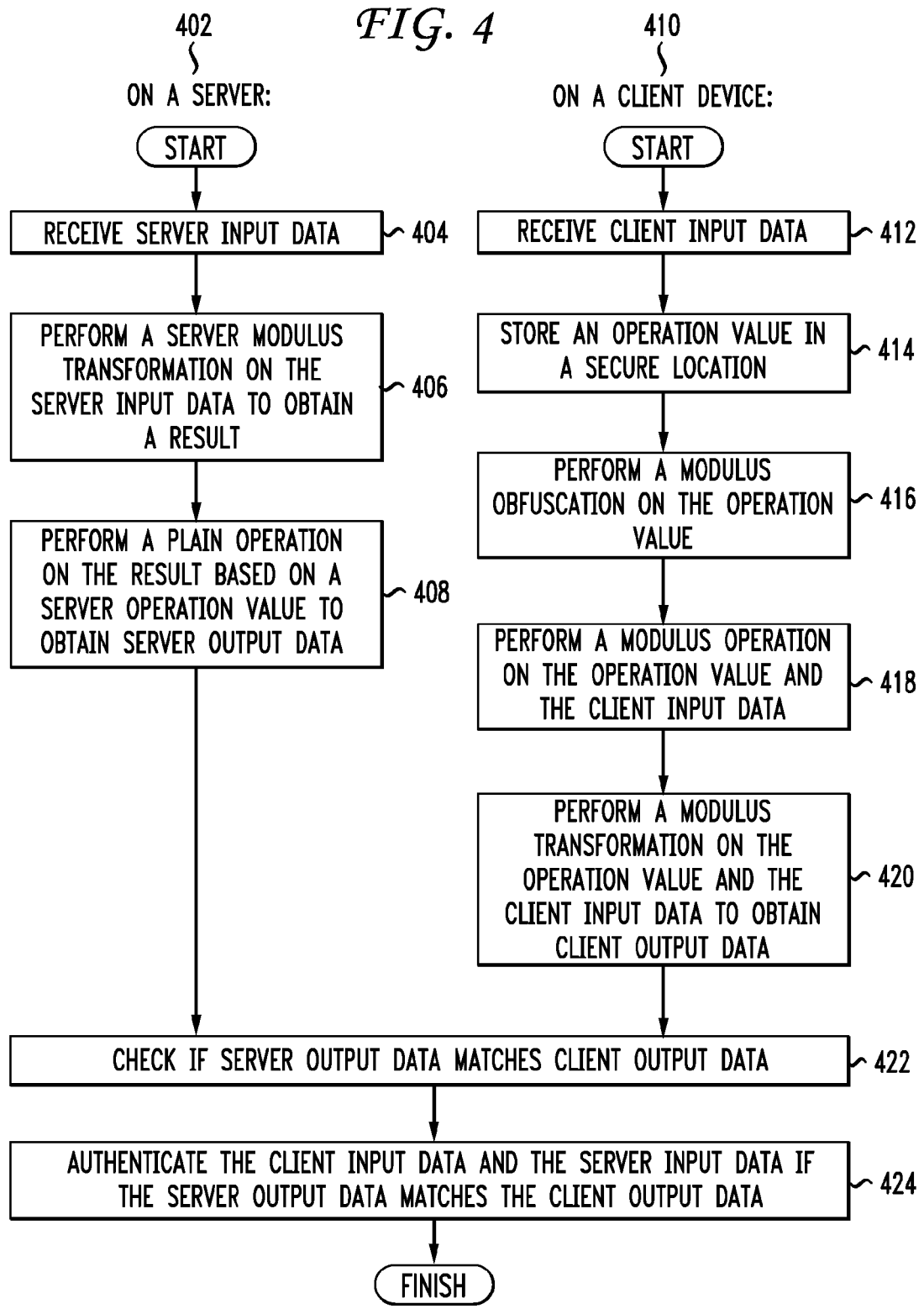
FIG. 4 illustrates an example client/server method embodiment.

FIG. 4 illustrates an example client/server method embodiment. This example is a blending of methods shown in FIG. 2 and FIG. 3 in that it demonstrates both the server and the client operating in unison. In this respect, much of FIG. 4 overlaps with FIGS. 2 and 3. The first portion of the method is performed on a server 402. The server receives server input data 404. The server performs a server modulus transformation on the server input data to obtain a result 406. The server performs a plain operation on the result based on a server operation value to obtain server output data 408.

The second portion of the method is performed on a client device 410. The client receives client input data 412. The client input data, under optimal conditions is the same as the server input data. If the input data on the client and the server are not the same, then the output data will not match and no authentication can be performed. The client stores an operation value in a secure location 414. The client performs a modulus obfuscation on the operation value 416. The client performs a modulus operation on the operation value and the client input data 418. The client performs a modulus transformation on the operation value and the client input data to obtain client output data 420.

After both the server and the client have obtained their respective output data, either one can check if the output data match 422. In that case, either the server or the client transmits the output data to the other. Alternately, a third device or module can check if the output data match. In that case, the server and the client each transmit the output data to the third device. The device that checks the output data can authenticate the input data if the server output data matches the client output data 424.

Figure 5:
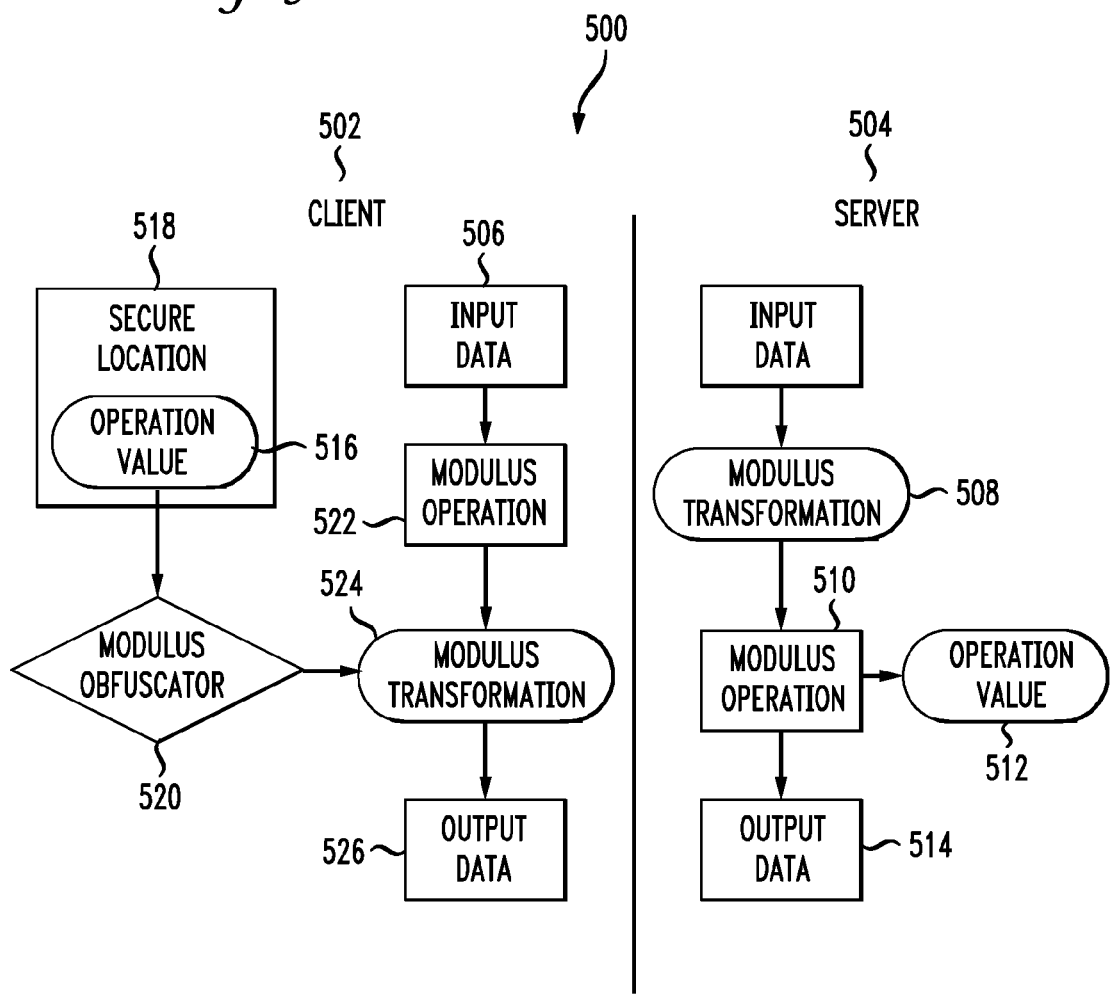
FIG. 5 illustrates basic client and server operations side by side.

FIG. 5 illustrates basic client and server operations side by side in a box diagram 500. The diagram shows two parallel tracks, one for a client 502 and one for a server 504. Both the client and the server receive the same input data 506. The input data can also be called the initial message and may relate to a cryptographic key. The server performs a modulus transformation 508 on the input data a and b, performs a plain operation 510 on an operation value 512 and the result of the modulus transformation. The plain operation yields output data 514.

The client 502 receives the same input data 506 as the server 504. The client retrieves an operation value 516 from a secure location 518. The secure location can be on the client 502 or in a remote location; however, practically speaking, most clients will incorporate the secure location. The client performs a modulus obfuscation 520 on the operation value 516. The client passes the result from the modulus obfuscation and the received input data to a modulus operation 522. The client 502 passes the result from the modulus operation 522 to a modulus transformation 524. The modulus transformation 524 calculates output data 526. After both the system and the client calculate their respective output data, the client or server can compare the output data from both the server and the client. The pseudocode presented in FIGS. 6A, 6B, 7A, and 7B detail possible methods of operation for the described boxes.

FIGS. 6A, 6B, 7A, and 7B highlight particular pseudocode implementations that take advantage of these arithmetic principles. These pseudocode implementations are exemplary; other equivalent variations are possible.

Figure 6A:
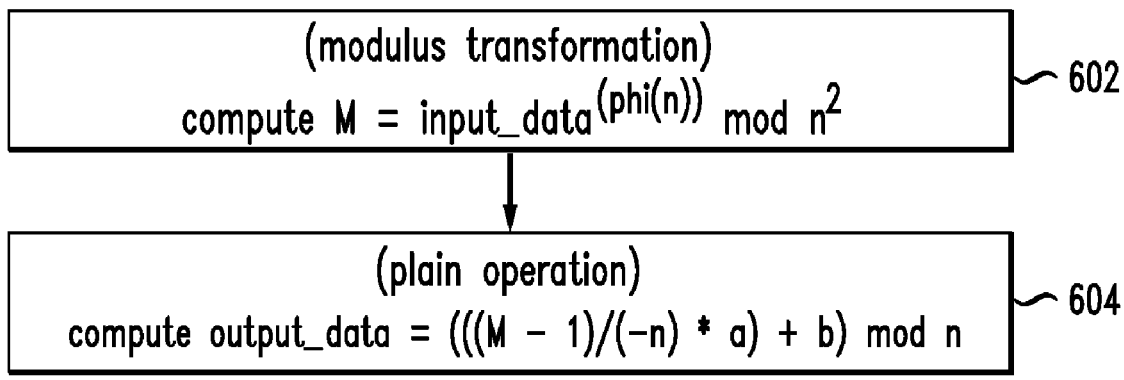
FIG. 6A illustrates pseudocode implementing basic modulus obfuscation on a server.

FIG. 6A illustrates pseudocode implementing basic modulus obfuscation on a server. The server performs a modulus transformation (602). The server then performs a plain operation (604) to obtain output data. The server performs these steps in a simple, straightforward manner without obfuscation. The server performs an equivalent operation to that performed on the client, but without the need for obfuscation and any associated performance penalty.

Figure 6B:
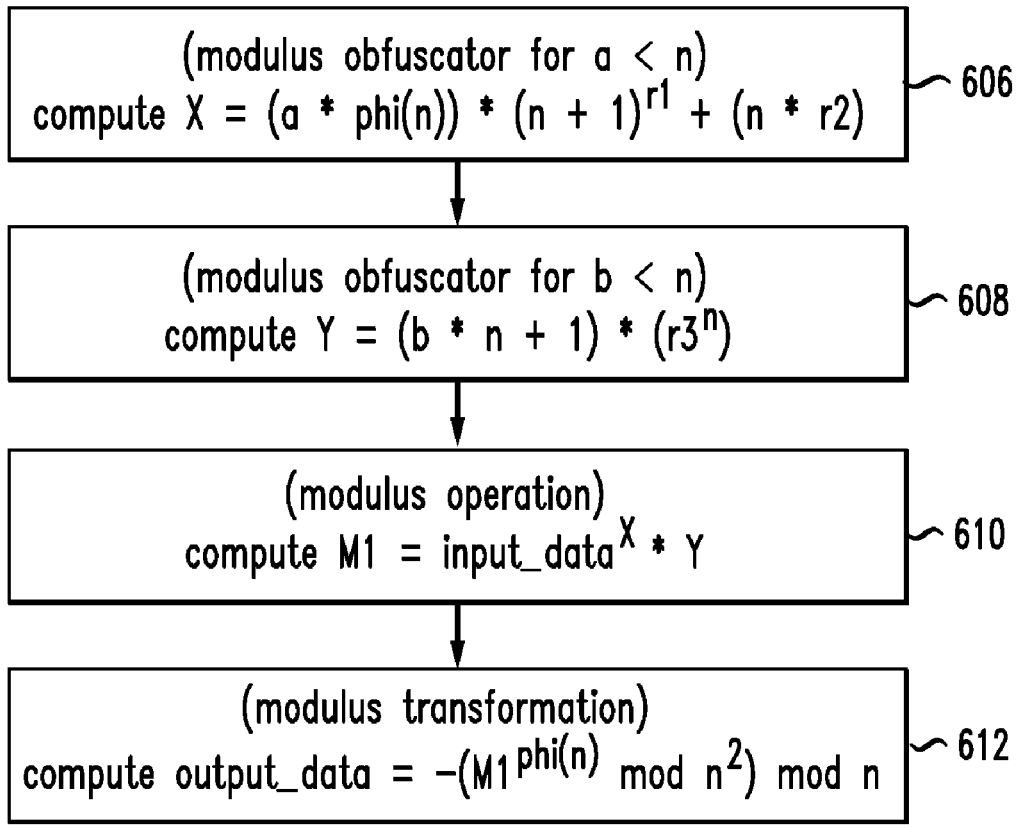
FIG. 6B illustrates pseudocode implementing basic modulus obfuscation on a client.

FIG. 6B illustrates pseudocode implementing basic modulus obfuscation on a client. The operation value can be split into two separate values, a and b. The client performs a modulus obfuscation (606) for (a<n) by computing $X=(a*phi(n))*(n+1)^{r1}+(n*r2)$. The client performs a modulus obfuscation (608) for (b<n) by computing $Y=(b*n+1)*(r3'')$. Next the client performs a modulus operation (610) by computing $M1=input\_data^X*Y$. The client performs a modulus transformation (612) by computing output_data=$-(M1^{phi(n)} \mod n^2) \mod n$. The input data can relate to a cryptographic key and the output data from the client and the server can then serve as a verification that the cryptographic keys match or for other purposes. The server operations are simple and quickly calculated, where the client operations are longer, more complex, and involve additional values, while still remaining equivalent to each other.

Figure 7A:
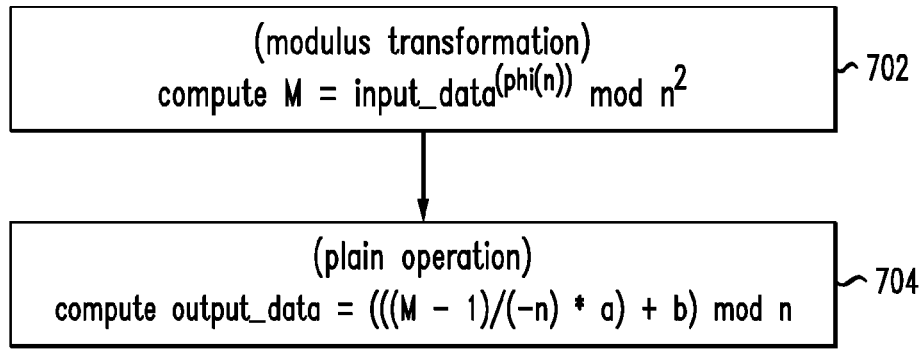
FIG. 7A illustrates pseudocode implementing complex modulus obfuscation on a server.

FIG. 7A illustrates pseudocode implementing complex modulus obfuscation on a server. The server performs a modulus transformation (702) by computing M=(input data)$^{phi(n)} \mod n^2$. The server then performs a plain operation (704). An example plain operation calculates output data= $(((M-1)/(-n)*a)+b) \mod n$. The server performs these steps in a simple, straightforward manner without obfuscation. The server performs an equivalent operation to that performed on the client, but without the need for obfuscation and any associated performance penalty. The server performs identically in both basic and more complex obfuscation schemes. The change in complexity resides entirely on the client device. In this manner, as one modulus obfuscation scheme is compromised, a device manufacturer can employ additional, more complex schemes on the client devices without any need to modify the server. Alternately, a device manufacturer can develop several compatible modulus obfuscation schemes and use them at random among a population of devices such that a set of steps to compromise one device is not universally applicable to all other devices.

Figure 7B:
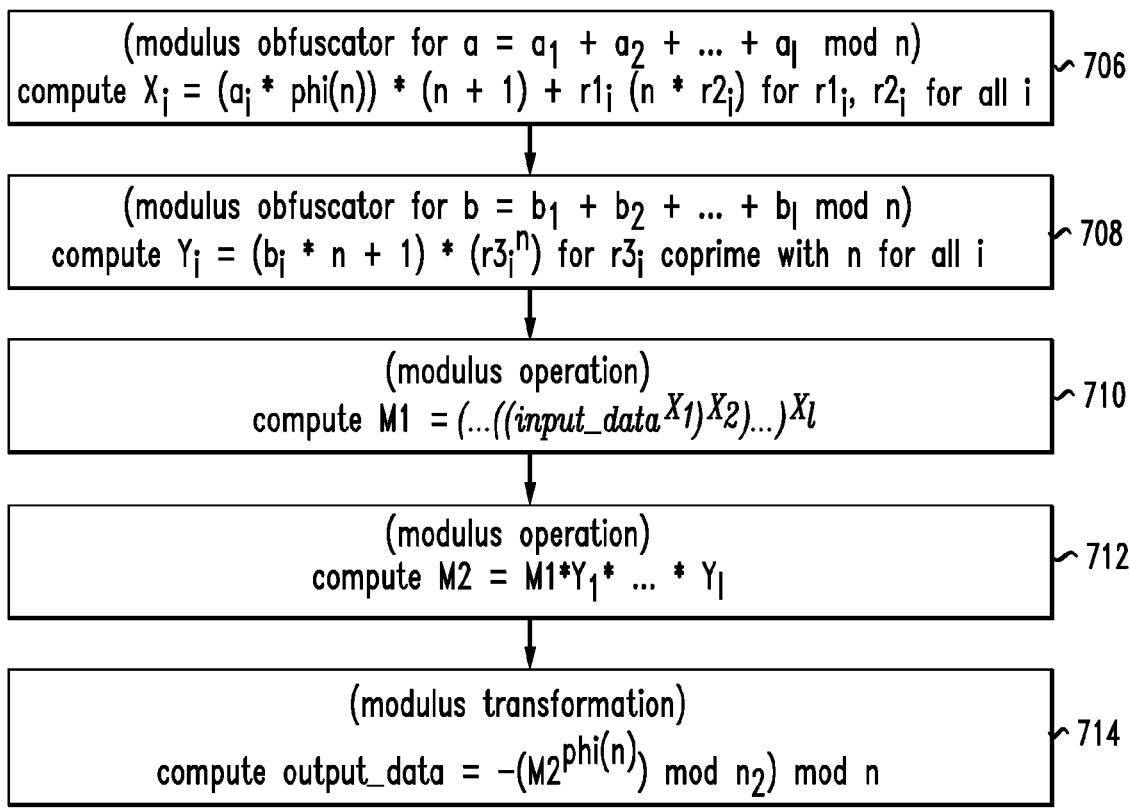
FIG. 7B illustrates pseudocode implementing complex modulus obfuscation on a client.

FIG. 7B illustrates pseudocode implementing complex modulus obfuscation on a client. The client performs modulus obfuscation (706) for ($a=a_1+a_2+ \ldots +a_1 \mod n$) by computing $X_i=(a_i*phi(n))*(n+1)+(n*r2_i)$ for $r1_i$, $r2_i$ for all i. The client performs modulus obfuscation (708) for ($b=b_1+b_2+ \ldots +b_1 \mod n$) by computing $(Y_i=(b_i*n+1)*(r3_i''))$, where $r3_i$ is coprime with n for all i. The client can perform the modulus operation in two steps. The first step in the modulus operation is to compute $(M1=( \ldots ((M^{X_1})^{X_2}) \ldots )^{X_1})$ using successive exponentiation (710). The second step in the modulus operation is to compute $M2=M1*Y_1*Y_2 \ldots *Y_1$ using successive multiplication (712). Next, the client performs the modulus transformation (714) by computing output_data=$-(M2^{phi(n)} \mod n^2) \mod n$. The output data from the client and the server can then serve as a verification that the inputs or cryptographic keys do or do not match, or for other purposes.

The obfuscation techniques described herein can be used alone or in conjunction with other obfuscation techniques such as branch extraction obfuscation, conditional expansion obfuscation, array obfuscation, etc. A user or the system can establish a threshold of desired complexity to decide the order, quantity, and types of obfuscation to apply.

Embodiments within the scope of the present invention may also include computer-readable media for carrying or having computer-executable instructions or data structures stored thereon. Such computer-readable media can be any available media that can be accessed by a general purpose or special purpose computer, including the functional design of any special purpose processor as discussed above. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, data structures, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the invention. For example, the principles herein may be applied to nearly any client and server which authenticate shared data, such as a portable media player and server which deal with DRM'd media or a GPS device which authenticates a user's key to a server. Those skilled in the art will readily recognize various modifications and changes that may be made to the present invention without following the example embodiments and applications illustrated and described herein, and without departing from the true spirit and scope of the present invention.

We claim:

1. A method comprising:
    receiving input data on a client device;
    storing, via a processor, an operation value in a secure location;
    performing a modulus obfuscation on the operation value, wherein the modulus obfuscation is based on an Euler phi function and coprime integers;
    performing a modulus operation on the operation value and the input data;
    performing a modulus transformation on the operation value and the input data to obtain client output data; and
    checking if the client output data matches corresponding server output data.

2. The method of claim 1, the method further comprising authenticating the input data if the client output data matches the corresponding server output data.

3. The method of claim 1, wherein the input data relates to a cryptographic key.

4. The method of claim 1, wherein the operation value is a combination of two values, a and b.

5. The method of claim 4, wherein performing the modulus obfuscation includes computing $X=((a*phi(n))*(n+1)^{r1}+(n*r2))$ and computing $Y=((b*n+1)*(r3''))$, where r1 is an integer coprime with $n*phi(n)$, where r2 and r3 are non-zero, where n is a positive integer, and where phi is the Euler phi function.

6. The method of claim 5, wherein performing the modulus operation includes computing $M1=((\text{input data})^x)*Y$.

7. The method of claim 6, wherein performing the modulus transformation includes computing client output data= $(-(M1^{phi(n)} \bmod n^2) \bmod n)$.

8. The method of claim 4, the method further comprising splitting values a and b into respective sets of values that sum respectively to a and b.

9. The method of claim 8, wherein performing the modulus operation includes computing a value M1 through successive exponentiation and repeated multiplication.

10. A method comprising:
    receiving input data on a server device;
    performing a modulus transformation on the input data to obtain a result;
    performing a plain operation on the result and an operation value to obtain server output data; and
    checking if the server output data matches corresponding client output data from a client device that (1) receives input data, (2) stores an operation value in a secure location, (3) performs a modulus obfuscation on the operation value, wherein the modulus obfuscation is based on an Euler phi function and coprime integers, (4) performs a modulus operation on the operation value and the input data, and (5) performs a modulus transformation on the operation value and the input data to obtain client output data.

11. The method of claim 10, the method further comprising authenticating the received input data if the server output data matches the corresponding client output data.

12. The method of claim 10, wherein the input data relates to a cryptographic key.

13. The method of claim 10, wherein performing the modulus transformation includes computing $M=((\text{input data})^{phi(n)} \bmod n^2)$, where n is a positive integer and where phi is the Euler phi function.

14. The method of claim 13, wherein performing the plain operation includes computing server output data=$(((M-1)/(-n)*a)+(b \bmod n))$, wherein a and b are parts of an operation value.

15. A method comprising:
    on a server:
        (1) receiving server input data;
        (2) performing a server modulus transformation on the server input data to obtain a result;
        (3) performing a plain operation on the result based on a server operation value to obtain server output data;
    on a client device:
        (1) receiving client input data;
        (2) storing an operation value in a secure location;
        (3) performing a modulus obfuscation on the operation value, wherein the modulus obfuscation is based on an Euler phi function and coprime integers;
        (4) performing a modulus operation on the operation value and the client input data;
        (5) performing a modulus transformation on the operation value and the client input data to obtain client output data; and
    checking if server output data matches client output data.

16. The method of claim 15, wherein server input data and client input data pertain to a cryptographic key.

17. The method of claim 15, the method further comprising authenticating the client input data and the server input data if the server output data matches the client output data.

18. The method of claim 15, wherein performing the modulus obfuscation on the client device includes computing $X=((a*phi(n))*(n+1)^{r1}+(n*r2))$ and computing $Y=((b*n+1)*(r3''))$, where r1 is an integer coprime with $n*phi(n)$, where r2 and r3 are non-zero, where n is a positive integer, where the operation value is a combination of values a and b, and where phi is the Euler phi function.

19. The method of claim 18, wherein performing the modulus operation on the client device includes computing $M1=((\text{input data})^x)*Y$.

20. The method of claim 19, wherein performing the modulus transformation on the client device includes computing client output data=$(-(M1^{phi(n)} \bmod n^2) \bmod n)$.

21. The method of claim 15, wherein performing the modulus transformation includes computing $M=((\text{input data})^{phi(n)} \bmod n^2)$, where n is a positive integer and where phi is the Euler phi function.

22. The method of claim 15, wherein the operation value is a combination of two values, the method further comprising splitting each of the two values into respective sets of values that sum respectively to the two values.

23. The method of claim 15, wherein performing the modulus operation includes computing a value M1 through successive exponentiation and repeated multiplication.

* * * * *